United States Patent [19]

Lewis

[11] 4,352,339
[45] Oct. 5, 1982

[54] RABBIT FEEDER
[76] Inventor: Howard Lewis, 16820 Crowder Rd., SE., Tenino, Wash. 98589
[21] Appl. No.: 227,632
[22] Filed: Jan. 23, 1981
[51] Int. Cl.³ .............................................. A01K 5/01
[52] U.S. Cl. .................................... 119/18; 119/52 R
[58] Field of Search ................ 119/18, 52 R; 222/457
[56] References Cited
U.S. PATENT DOCUMENTS

| 238,055 | 2/1881 | Rutz | 119/18 X |
|---|---|---|---|
| 2,532,726 | 12/1950 | Lajoie et al. | 119/52 R |
| 2,699,752 | 1/1955 | Reyes | 119/18 |
| 3,418,974 | 12/1968 | Reeves | 119/18 |
| 3,776,190 | 12/1973 | Hurlbert | 119/18 |
| 4,180,014 | 12/1979 | Mathews | 119/52 R |

FOREIGN PATENT DOCUMENTS 386571  1/1933  United Kingdom ............. 119/52 R

OTHER PUBLICATIONS

"The Purina Rabbit Book," Ralston Purina Company, Special Chows Division, St. Louis, MO, p. 18.

Primary Examiner—Gene Mancene
Assistant Examiner—Robert P. Swiatek

[57] ABSTRACT

A bunny feeder is disclosed, removably mounted to a rabbit creep feeder and adapted to be secured to a rabbit hutch. Both feeders have feed storage hoppers communicating with open feed troughs. The troughs and hoppers are mountable through a small opening in the screen wall of a hutch so the troughs project inside the hutch and the hoppers project outside. An edge of a front wall on the bunny feed through projects forward of a similar lip on the creep feed trough. The bunny feed trough is situated below the creep feed trough so any doe feed that may spill over the lip of the creep feed trough will be caught by the front wall of the bunny trough and be guided into the bunny feed trough. The hopper of the bunny feeder cooperates with the hopper of the doe feeder to define a restricted opening, communicating with the bunny feed trough, that effectively prevents bunnies from escaping by crawling through the hopper.

10 Claims, 8 Drawing Figures

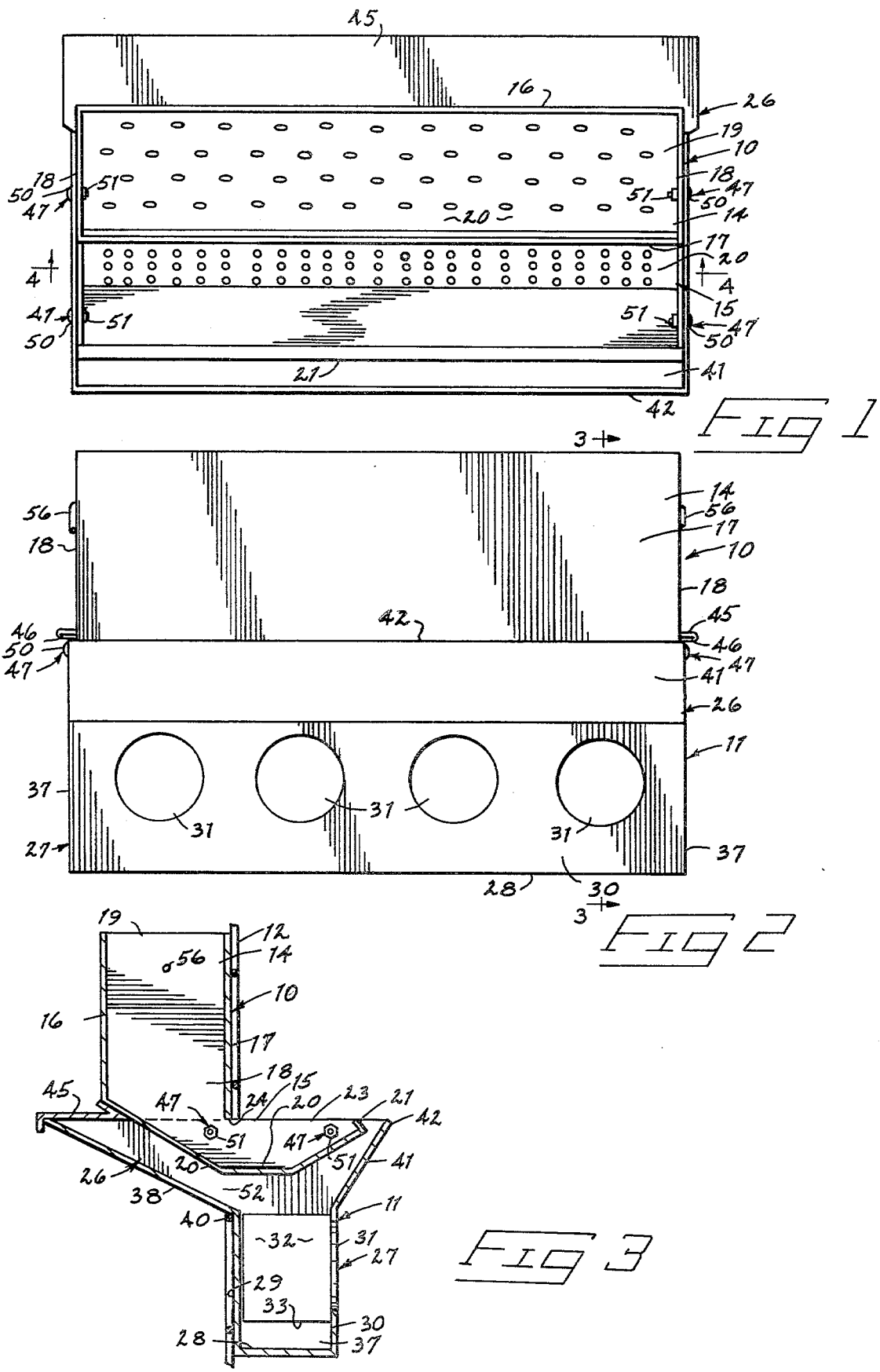

RABBIT FEEDER

TECHNICAL FIELD

The present invention is related to rabbit feeders and more particularly to bunny feeders that can be combined with doe feeders and, together, mounted to a wall of a rabbit hutch.

BACKGROUND

Doe rabbits and their litters are kept together in the same cage at least until weaning time. The bunnies, during the time spent with their mother, are fed on mother's milk and special bunny feed. Bunny feed is usually specially formulated for growing litters and is preferably kept separate from the doe feed.

Does have a tendency to eat bunny food, depriving the bunnies of nutrients needed at a critical time of development. Special free choice "creep feeders" have been developed for bunny feed that have small trough openings that only the small bunnies can enter. Creep feeders are produced that may be placed entirely within the cage. Bunny feeders are also produced in free choice configurations similar to the typical free choice rabbit feeders having a feed trough within the cage and a feed hopper mounted to the cage exterior. The "in cage" creep feeders are undesirable because the cage door must be opened to gain access to the feed hopper. The "outside hopper" creep feeders are more desirable, with free access to the exterior hoppers. Even so, the "outside hopper" free choice type feeders are not without substantial drawbacks.

Outside hopper feeders are typically mounted on a screen wall of a hutch with a trough extending through an opening cut through the screen. It is desirable to keep the screen opening size at a minimum in order to maintain the structural integrity of the hutch. Often, however, bunny creep feeders are attached directly to an adult creep feeder, with both troughs projecting through the screen. The combined troughs require a substantially larger screen opening due in part to the combined feeder trough size and to the trough walls leading to their respective hoppers. The enlarged mounting openings substantially weaken the screen wall and seriously decrease the structural integrity of the hutch.

Another difficulty with free choice feeders is loss of feed. Does with litters, and other rabbits, are not dainty in their eating habits and frequently scratch in the feed troughs to get access to more feed. Some of the feed is therefore forced over the front lip of the trough. Depending upon the hutch, the rabbit feed either drops onto a solid floor or through the open mesh of a screen floor. Feed dropped through a screen floor is wasted. Feed dropped onto a solid floor can quickly become contaminated. Either way, the dropped feed is wasted and, as a result, represents a sizable percentage of the overall costs for keeping rabbits.

The present invention eliminates both above problems by providing a bunny feeder that is adapted to mount to a creep feeder so the troughs of both can fit through a relatively small screen opening. The bunny trough is situated below the creep feed trough and includes a forward wall that extends up to an edge spaced forward of the creep feed trough lip. Doe feed that is scratched from the creep feed trough will drop into the bunny feed trough where it may be consumed by the bunnies. The doe feed is not wasted and represents only a small part of the bunny diet so no harmful growth rate effects occur.

BRIEF DESCRIPTION OF THE DRAWINGS

A preferred form of the present invention is shown in the accompanying drawings in which:

FIG. 1 is a top plan view of a bunny feeder attached to a doe feeder;

FIG. 2 is a front elevation view;

FIG. 3 is a cross-sectional view taken along line 3—3 in FIG. 2;

DETAILED DESCRIPTION OF A PREFERRED EMBODIMENT

Figure 4:
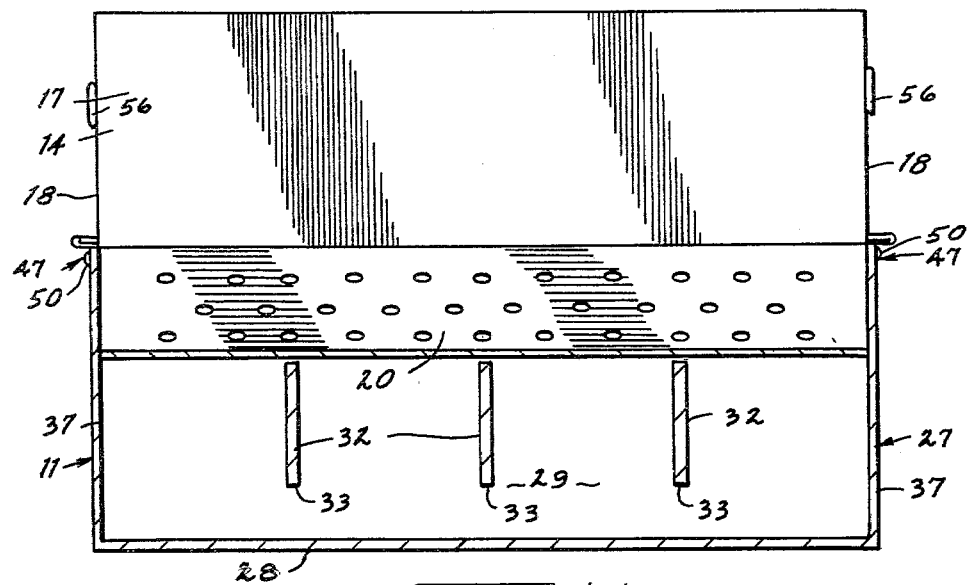
FIG. 4 is a cross-sectional view taken along line 4—4 in FIG. 1.
Figure 5:
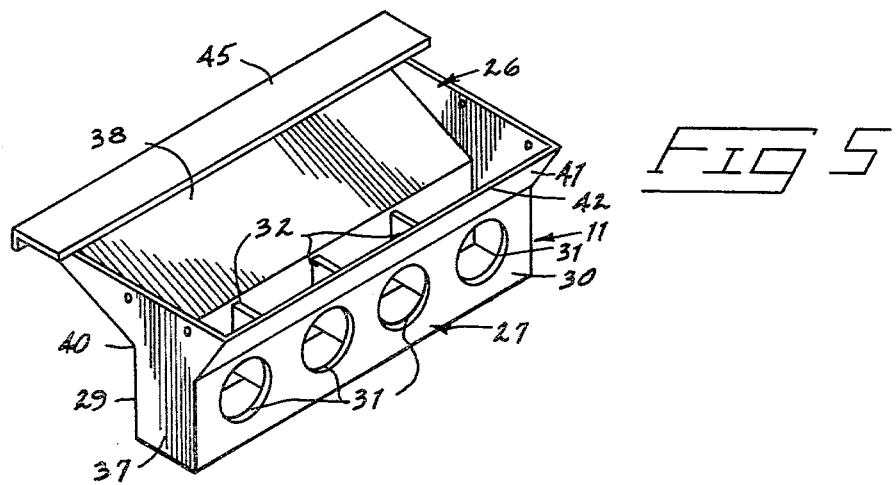
FIG. 5 is a pictorial view of the present bunny feeder.

The present invention is embodied in a combined creep feeder 10 and bunny feeder 11 as shown in FIGS. 1 through 4 singularly as a bunny feeder 11 adapted for mounting a conventional creep feeder. The present bunny feeder can be supplied either in combination with a creep feeder or sold separately to be mounted to existing creep feeders. The assembled feeder is intended to be mounted to a wire screen side wall 12 (shown diagrammatically in FIGS. 6 through 8) of a rabbit hutch.

The creep feeder 10 includes an upwardly open hopper 14 in communication with an upwardly open feed trough 15. The hopper and feed trough are substantially integral, preferably formed of noncorrosive sheet metal.

The hopper 14 is substantially rectangular, comprised of an upright back wall 16, a parallel front wall 17 and transverse end walls 18. The walls 16 through 18 define a top opening 19 through which adult rabbit feed (not shown) is received. An apertured bottom wall 20 extends from the back wall 16, under the front wall 17 of the feed trough 15. The bottom wall 20 leads to a forward lip 21 at a front side of the feed trough 15, defining one side of a trough opening 23. The end walls 18 also extend forwardly to join the bottom wall 20 at opposite ends to define opposed end sides of the trough opening. The back side of the trough opening is defined by a bottom edge 24 (FIG. 3) of the front wall 17. Feed will flow gravitationally through the open area or throat between the front wall edge 24 and the bottom wall 20 into the feed trough.

The front wall 17 is positioned in relation to the feed trough to fit in abutment with the screen wall 12. The hopper 14 is mounted on the outside of the screen wall. The trough 15 projects through an opening in the screen wall into the hutch to enable the adult rabbit to each from the trough.

The bunny feeder 11 is shown in FIGS. 1 through 5. The bunny feeder 11 includes an upwardly open hopper 26 communicating with a bunny feed trough 27. The bunny feed trough 27 includes a relatively horizontal bottom wall 28 that is apertured similar to the apertured bottom wall 20 of the creep feeder. Bottom wall 28 leads to a back wall 29 of the trough.

The back wall 29 is upright and adapted to fit in abutment with the interior of the wire screen wall 12. A front wall 30 of the trough 27 is parallel to and spaced from the back wall 29 by the bottom wall 28.

The front trough wall 30 is provided with access openings 31 that are sized specifically to permit access into the feed trough by bunnies. The size of the opening 31 does not permit the mother doe access to feed in the trough 27.

Upright partitions 32 (FIGS. 4 and 5) separate feeding areas within the trough between adjacent openings 31. The partitions 32 are mounted to the front wall 30 and include bottom edges 33 that are spaced upwardly from the bottom wall 28. This allows feed to spread evenly along the length of the trough 27. It also effectively prevents bunnies from crawling into the trough and becoming trapped.

The bunny feed hopper 26 openly communicates with the trough 27 and, preferably, is formed integral therewith. Side walls 37 of the hopper 26 also define opposed side walls of the trough. A hopper back wall 38 is formed integral with the trough back wall 29. The back wall 38 extends angularly outward from the back trough wall 29 from an intersection 40. Preferably, the intersection 40 is a fold line, and the walls 29 and 38 are integral. Similarly, a hopper front wall 41 of the hopper is integral with and extends angularly inward from the trough front wall 30. The hopper front wall 41 leads upwardly to an edge 42. The edge 42 may lie along a horizontal plane that is coincident with upper edges of the side walls 37 and back wall 38. The opening defined by these walls (FIG. 5) is sufficiently large to receive the feed trough 20 of the creep feeder 10.

A portion of the upwardly facing opening of the bunny feed hopper may be selectively covered by a slide cover 45. The cover 45 may slide along appropriate guides 46 that are integral with the hopper side walls 37 and are folded outwardly therefrom. The cover 45 selectively covers an area of the hopper that is intended to receive bunny feed when the creep feeder and bunny feeder are assembled as shown in FIGS. 1 through 4.

A mounting means is generally shown at 47 to mount the creep feeder 10 with its feed trough 20 situated within the bunny feed hopper and with the front edge 42 of the bunny feed hopper spaced forwardly from the front lip 21 of the creep feed trough. Means 47 may include appropriate apertures formed through the side walls of the bunny feed hopper and similar apertures that extend through the side walls of the creep feed trough 15. Screws 50 and nuts 51 may be threadably engaged through the aligned apertures to secure the feeders together in the desired relative positions. It should be noted that other forms of mounting means 47 can be used as effectively. Such means may include permanent attachments such as spot welding (when the creep feeder and bunny feeder are produced as a unit) or as removable clips, rivets, or other commercially available fasteners.

The mounting means 47 is provided to interconnect the creep feeder and bunny feeder with the front wall 17 of the creep feed hopper in substantially vertical alignment with the upright back wall 29 of the bunny feed hopper. With this arrangement, the assembled feeders will fit into a hutch with the front hopper wall 17 in abutment with the screen 12 along an outside surface and the back wall 29 of the bunny feeder abutting an inside surface of the same screen.

The mounting means 47 also positions the creep feeder and bunny feeder relative to one another so a narrow restriction 52 (FIG. 3) is provided between the bottom wall 20 of the creep feed trough and the intersection 40 along the back wall 29 of the bunny feed hopper. The restriction is sufficient to allow gravitational free flow of bunny feed through the hopper and into the bunny feed trough while effectively preventing escape of a bunny through the hopper.

Mounting means 47 also positions the creep feeder 10 and bunny feeder 11 with the creep feed trough lip 21 spaced inwardly from the edge 42 of the bunny feeder (FIG. 3). The lip 21 and edge 42 are situated at substantially equal elevations, and define an opening into the bunny feed hopper through which doe or adult feed can fall. The falling feed will be guided into the bunny feed hopper and from there to the bunny feed trough. This substantially eliminates waste of doe feed which typically occurs in other conventional forms of feeders.

Figure 6:
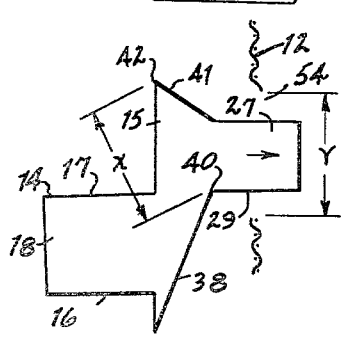
FIGS. 6 through 8 are diagrammatic views showing the steps involved in mounting the present feeder to a hutch screen wall.
Figure 7:
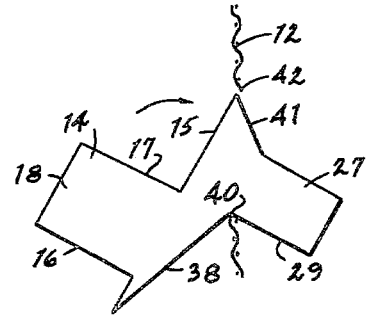
Figure 8:
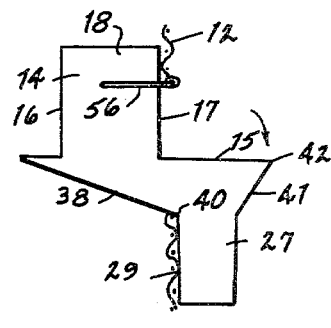

FIGS. 6 through 8 illustrate a feature of the present invention that allows mounting of the assembled feeders through a relatively small opening 54 (FIG. 6) in the screen wall 12. The relative positions of the assembled feeders 10 and 11 are such that the distance from intersection 40 and the edge 42 of the bunny feeder (indicated at "X" in FIG. 6) determines the vertical dimension of the screen opening 54. This opening can be made just slightly greater than the dimension "X". The vertical dimension of the opening is illustrated in FIG. 6 by the dimension Y.

The width dimension of the bunny feed trough between the front wall 30 and back wall 38 is substantially less than the opening dimension Y. Therefore, the assembled feeders can be inserted horizontally as shown in FIG. 6 through the opening 54. Following insertion of the bunny feed trough, the intersection 40 or fold line is rested against the bottom edge of the opening and the assembled troughs are tipped upwardly. The edge 42 will pass under the top edge of the opening and allow further pivotal movement upwardly until the front wall 17 of the creep feed hopper 14 comes into abutment with the outside surface of the screen and the back wall 29 of the bunny feed trough comes into abutment with an inside surface of the screen. Appropriate fasteners such as the wire 56 shown in FIG. 8 can then be used to secure the assembled feeders to the screen.

During operation, doe or adult feed or ordinary rabbit feed is poured into the upwardly open creep feeder hopper 14. The feed slides gravitationally into the creep feed trough 15 for free access by the mother doe. Similarly, the bunny feed can be poured into the bunny feed hopper (after removal of the cover 45). The bunny feed will slide down the back wall 38 of the hopper and drop into the bunny feed trough 27.

Access to the doe feed can be gained only by the larger doe rabbit due to the elevational difference of the feed troughs. Spillage of feed from the creep feed trough 15 is caught between the lip 21 and edge 42 and is directed downwardly by the hopper wall 41 into the bunny feed trough, where it can be consumed by the bunnies. The feed is therefore not wasted.

Bunnies are provided access to their feed through the small openings 31. The bunnies gain access to feed by inserting their heads through the openings 31. Any bunny crawling into an opening 31 is prevented from becoming trapped in the hopper or trough by the partitions 32, and escape from the hopper is prevented by the restriction 52.

Both hoppers 11 and 26 can be monitored periodically and refilled when the feed level becomes low.

Refilling is accomplished easily from the exterior of the hutch so the doe and her litter are not disturbed.

The above description and attached drawings are given by way of example to set forth a preferred form of the present invention. Modifications and alterations of the described and illustrated elements may be envisioned which fall within the scope of the following claims.

What is claimed is:

1. A rabbit feeder for storing and dispensing doe and bunny feed, the rabbit feeder being mountable through an opening in an upright wall of a rabbit hutch, wherein the wall opening has a prescribed vertical dimension, said feeder comprising:

an upright creep feed storage hopper for receiving doe feed;

an upwardly open creep feed trough communicating with the storage hopper to receive doe feed therefrom;

wherein the creep feed trough has a front side and includes a front lip extending along the front side;

a bunny feed hopper adjacent the creep feed storage hopper;

an open bunny feed trough located below the creep feed trough for receiving bunny feed from the bunny feed hopper;

wherein the bunny feed trough includes an upright front wall leading upwardly from below the creep feed trough to a front bunny feed trough edge and forming an opening therebetween so that doe feed spilled over the lip of the creep feed trough falls into the opening and into the bunny feed trough;

the creep feed storage hopper including an upright front wall adapted to engage the upright hutch wall along an outside surface thereof directly upward of the wall opening;

the bunny feed trough including an upright back wall adapted to engage the hutch wall along an inside surface thereof directly downward of the wall opening;

a bottom bunny feed hopper wall leading up and outwardly from an intersection with said upright back wall;

wherein the dimension from the intersection to the bunny feed trough edge is less than the prescribed vertical dimension of the wall opening to enable the creep feed trough and the bunny feed trough to be inserted through the wall opening.

2. The rabbit feeder as claimed by claim 1 further comprising a restricted opening between the bunny feed hopper and doe feed trough for allowing passage of feed to the bunny feed trough but preventing escape of bunnies through the restricted opening.

3. The rabbit feeder as claimed by claim 2 further comprising bunny access openings formed in the front wall of the bunny feed trough facing outwardly thereof.

4. The rabbit feeder for attachment to a rabbit hutch as claimed by claim 1 further comprising means on one of the hoppers for releasably securing the feeder to a rabbit hutch.

5. A bunny feeder for mounting to a rabbit hutch screen wall below a rabbit creep feeder in which the creep feeder includes a trough with a front lip, the bunny feeder being mountable through an opening in the screen wall having a prescribed vertical dimension, said bunny feeder comprising:

an upwardly open bunny feed hopper having a front wall and a back wall spaced apart by end walls;

a front edge along the bunny feed hopper front wall;

the bunny feed hopper including an enlarged open top end adapted to receive the creep feeder trough;

mounting means on the bunny feed hopper adapted to mount the creep feeder with its trough situated within the bunny feed hopper and with the front edge of the bunny feed hopper spaced forwardly of the creep feeder trough front lip;

a bunny feed trough communicating with the bunny feed hopper positioned below the front hopper edge and adapted to receive feed spilled over the lip of the creep feeder trough, said bunny feed trough including an upright back wall;

the mounting means being adapted to mount the creep feeder trough in position within the bunny feed hopper to produce a restricted passage between the bunny feed hopper and the creep feeder trough that will prevent passage of a bunny therethrough;

said creep feeder having an upright hopper having an upright forward wall with said creep feeder trough extending forward of the upright forward wall;

said mounting means being adapted to mount the creep feeder to the bunny feeder so the upright forward wall of the creep feed hopper and the upright back wall of the bunny feed trough will abut the screen wall on opposite sides thereof when mounted to the hutch;

the bunny feed hopper back wall leading up and outwardly from an intersection with said upright back wall;

wherein the dimension from the intersection to the front edge of the bunny feed trough is less than the prescribed vertical dimension of the opening to enable the creep feeder trough and the bunny feed trough to be inserted through the opening.

6. The bunny feeder as claimed by claim 5 wherein the bunny feed trough is comprised of:

a front wall leading upwardly to the front bunny feed hopper wall;

access openings formed through the front trough wall; and partitions within the bunny feed trough, separating the access openings from one another.

7. The bunny feeder as claimed by claim 5 wherein the mounting means includes holes formed through the end walls of the bunny feed hopper and threaded fasteners extending through the holes and adapted to be received through a similar set of holes formed through the rabbit feeder.

8. A bunny feeder for mounting to a rabbit hutch below a rabbit creep feeder in which the creep feeder includes a feed trough with a front lip, said bunny feeder comprising:

an upwardly open bunny feed hopper having a front wall and a back wall spaced apart by end walls;

a front edge along the bunny feed hopper front wall;

mounting means on the bunny feed hopper adapted to mount the creep feeder with its feed trough situated within the bunny feed hopper and with the front edge of the bunny feed hopper spaced forwardly of the creep feeder feed trough front lip; and a bunny feed trough communicating with the bunny feed hopper positioned below the front hopper edge and adapted to receive feed spilled over the lip of the creep feeder trough;

the mounting means being adapted to mount the creep feeder feed trough in position within the bunny feed hopper to produce a restricted passage between them that will prevent passage of a bunny therethrough.

9. A bunny feeder for mounting to a rabbit hutch below a rabbit creep feeder in which the creep feeder includes a feed trough with a front lip, wherein the hutch has an opening in an upright wall thereof and wherein the creep feeder has an upright hopper with an upright forward wall with said creep feeder feed trough extending forward of the upright forward wall; said bunny feeder comprising:

an upwardly open bunny feed hopper having a front wall and a back wall spaced apart by end walls;

a front edge along the bunny feed hopper front wall;

a bunny feed trough communicating with the bunny feed hopper positioned below the hopper front edge and adapted to receive feed spilled over the lip of the creep feeder feed trough, said bunny feed trough including a back wall;

the bunny feed hopper including an enlarged open top end adapted to receive the feed trough of the creep feeder;

mounting means on the bunny feed hopper adapted to mount the creep feeder with its feed trough situated within the bunny feed hopper and with the front edge of the bunny feed hopper front wall spaced forwardly of the creep feeder feed trough front lip; and said mounting means being adapted to mount the creep feeder to the bunny feeder so the forward wall of the creep feeder hopper and the back wall of the bunny feed trough will abut the hutch wall on opposite sides thereof when mounted to the hutch.

10. A bunny feeder for mounting to a rabbit hutch below a rabbit creep feeder in which the creep feeder includes a feed trough with a front lip, the bunny feeder being mountable through an opening having a prescribed vertical dimension in an upright wall of a rabbit hutch, said bunny feeder comprising:

an upwardly open bunny feed hopper having a front wall and a back wall spaced apart by end walls;

a front edge along the bunny feed hopper front wall;

mounting means on the bunny feed hopper adapted to mount the creep feeder with its feed trough situated within the bunny feed hopper and with the front edge of the bunny feed hopper spaced forwardly of the creep feeder trough front lip;

a bunny feed trough communicating with the bunny feed hopper positioned below the front hopper edge and adapted to receive feed spilled over the lip of the creep feeder feed trough;

guide surfaces between the front and back walls of the bunny feed hopper; and a cover slidably engaging the guide surfaces and movable thereon between a position partially covering the bunny feed hopper and another position to one side of the bunny feed hopper.

* * * * *